Feb. 14, 1956 H. E. BESTE 2,734,937

TELEVISION SYNCHRONIZING SYSTEM

Filed Aug. 31, 1951

INVENTOR.
HAROLD E. BESTE

BY Darby & Darby

ATTORNEYS 2,734,937
Patented Feb. 14, 1956

2,734,937

TELEVISION SYNCHRONIZING SYSTEM

Harold E. Beste, Verona, N. J., assignor to Allen B. Du Mont Laboratories, Inc., Clifton, N. J., a corporation of Delaware Application August 31, 1951, Serial No. 244,667

3 Claims. (Cl. 178—5.2)

This invention relates to the synchronizing or phasing of color control devices used in color television systems.

Objects of the invention are to provide a system for synchronizing or phasing coloring devices in color television receivers, which will provide proper coloring of visual images and will not cause detrimental effects upon circuits in the television receiver. Other objects will be apparent.

In certain types of color television systems, such as those utilizing a rotating color filter disc in front of a picture tube at the receiver, it is desired to provide a synchronizing or phasing signal during each color frame. If the color filter sequentially provides fields of red, blue, and green colors, these three fields comprise a frame. The color phasing signal must occur, then, during every third field. When this is done, it is found that certain circuits in the television receiver are adversely affected. Automatic frequency control or scanning control circuits, for instance, which utilize a control signal derived from the average intensity of the received television signal, will behave in an erratic manner because of the non-uniform effect of the color phasing signal occurring every third field.

The objects of the invention are accomplished by providing a signal pulse during each field, each of said pulses containing substantially the same electrical energy. During each frame of three fields, two of these pulses are not utilized directly while the third signal pulse is utilized to control the color phasing. This latter signal may be called a color-synchronizing signal, and the other two signals may be called balancing signals. The signals are coded by means of radio-frequency energies contained therein.

Figure 1:
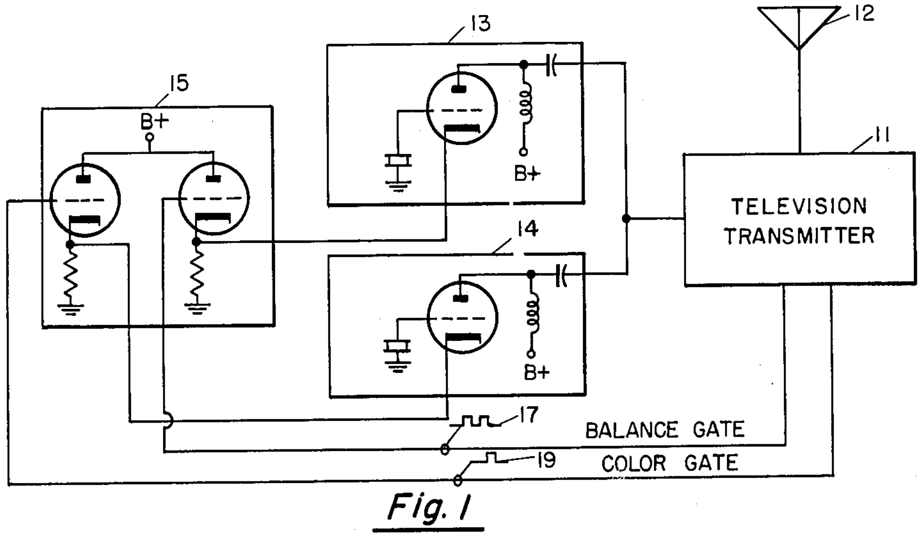
Figure 1 is a block diagram of a transmitter embodying the invention.

In Figure 1, a television transmitter 11 is connected to a transmitting antenna 12. A first oscillator 13 and a second oscillator 14 are connected to the transmitter. A keying or gating circuit 15 is connected to both of the oscillator circuits. Synchronizing or gating signals 17, 19 from the transmitter are fed or applied to the gating circuit.

Figure 2:
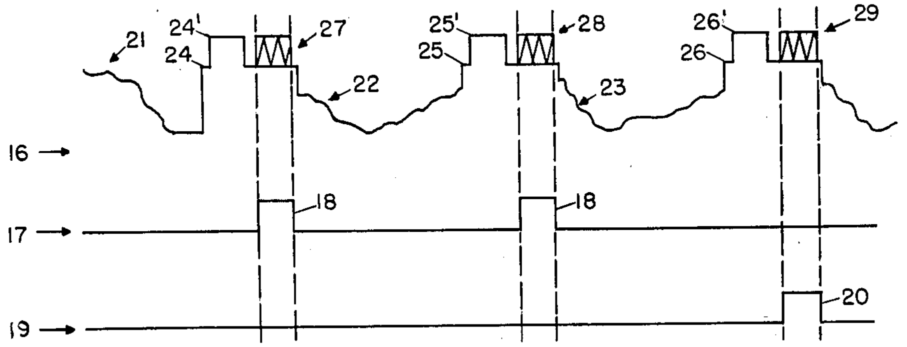
Figure 2 is a representative drawing of a television signal, during a three-color frame interval, utilizing the invention.

In Figure 2, a television signal 16 is shown as comprising video signal portions 21, 22, and 23, and blanking portions 24, 25, and 26 which are preferably vertical blanking periods and which customarily contain synchronizing pulses 24', 25', and 26'. During each blanking portion, there is a signal pulse 27, 28, and 29 of R. F. energy. These pulses 27, 28, 29 preferably occur during the first four equalizing pulses after the serrated vertical synchronizing pulse, in a television signal in accordance with present signal standards.

The R. F. energy in the balancing pulses 27 and 28 is of a different frequency than that of the color-phasing pulse 29. The balancing gating signal 17, which controls the balancing signals 27, 28, comprises pulses 18 which act to turn on the oscillator 13 at desired intervals of time. Similarly, the color-phasing pulse 29 is periodically gated on by the color-gate pulse 20 of the color-gate signal 19.

Figure 3:
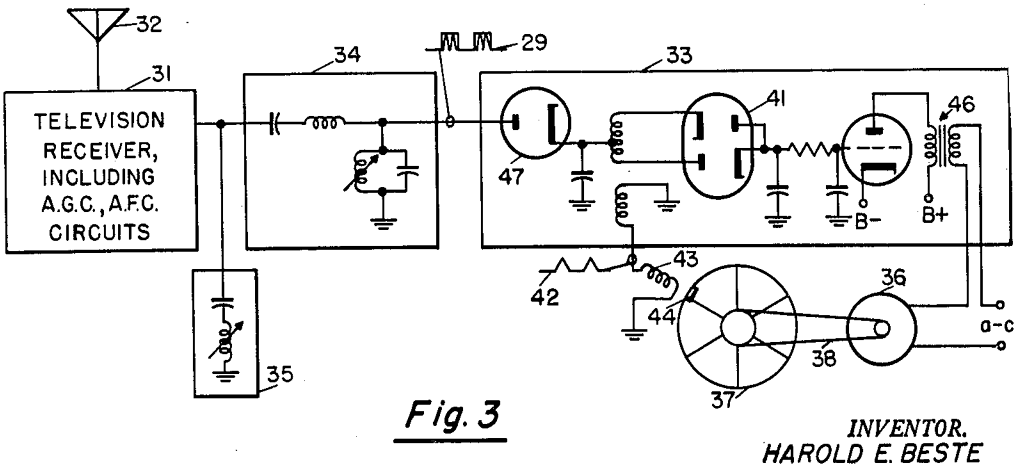
Figure 3 is a block diagram of a receiver embodying the invention.

In Figure 3, television receiver circuits 31 are connected to a receiver antenna 32. The receiver circuits 31 may contain the usual picture tube, loud speaker, and associated circuits. A color-phase control circuit 33 is connected to the receiver 31 through a filter 34. An absorption filter 35 may also be connected to the receiver 31. The phase control circuit 33 may be connected to control a driving means 36 which may be connected to a color filter disc 37 by means of a belt drive 38.

The phase control circuit 33 preferably comprises a phase discriminator 41 which compares the phase of the color-phasing pulse 29 with that of a timing signal 42 derived from the rotation of the color disc 37, by means of a pickup coil 43 and iron slug 44 on the disc. Alternatively, the signal 42 may be derived from an alternator connected to be driven by the color wheel. The output signal from the discriminator 41 is amplified and connected to control a saturable reactor 46 or other timing-control means connected in the power circuit of the driving means 36. A diode rectifier 47 may be included in the circuit to rectify the radio-frequency energy of the pulses 29 and derive therefrom a D.-C. pulse.

The color synchronizing signal 29 comprises a burst of radio-frequency energy which may be, for example, a 500 kilocycle sine wave. The balancing signals 27, 28 each comprises a burst of radio-frequency energy which may have, for example, a frequency about 50 kilocycles higher or lower than that of the synchronizing signal 29. For simplicity, it is preferable that the R. F. bursts of the balancing signals be of the same frequency. The oscillator 13 or 14 is tuned to generate the synchronizing pulse R.-F. energy; the other oscillator is tuned to generate the balancing pulse R.-F. energy. The keying or gating circuit 15 controls the oscillators 13 and 14 so that the proper pulse signals 27, 28, 29 occur at the proper times.

In the receiver, the filter 34 is tuned to have low impedance to and pass the synchronizing signal 29 through to the synchronizing circuit 33; the filter 34 rejects and does not pass the balancing signals 27, 28. The absorption filter 35 may be included if desired, and tuned to absorb the balancing signals 27, 28.

The A. G. C. and A. F. C. circuits make use of a control voltage derived from the average intensity level of the signal 16 shown in Fig. 2, in a well known manner. By providing the balance signals 27, 28, the control voltage is made smoother and more uniform than would otherwise occur; the balance signals, having substantially the same energies as the color synchronizing signal, thus improve the stability of these circuits and at the same time permit proper color synchronization of the system. It has been found that if the balancing signals of the invention are omitted, a "hump" occurs periodically in the A. G. C. and A. F. C. control voltages which causes erratic performance.

The balance signals must be separated from the synchronizing signal, as is done by the filter method described, so that these balance signals will not affect adversely the synchronizing circuits.

While a preferred system has been described having one synchronizing pulse and two balancing pulses driving each group of three color fields, it is to be understood that other arrangements may be employed in accordance with the invention. For instance, an interlaced color system may be employed which may preferably require the use of two synchronizing pulses per frame, plus several balancing pulses. The scope of the invention is defined in the following claims.

What is claimed is:

1. A color television system comprising means for generating electrical signals representing sequential fields of different predetermined color images, each of said color images being repetitive at a frame rate, each frame being made up of a plurality of field periods, said signal including during each field period a blanking and synchronizing portion, means for generating a pulse of oscillatory energy during each blanking portion and for making the amplitude and duration of all oscillatory pulses the same so as to add an equal amount of energy to each of said blanking portions, the frequency of the oscillatory pulse in one field of each frame being different from the frequency of the oscillatory pulses in the remainder of the fields of each frame, receiver means including a synchronizing circuit operated by said synchronizing portions and responsive also to the amount of energy in said oscillatory pulses, said receiver means comprising, in addition, a color device and a synchronizing circuit therefor, and selective means connected to said last-named synchronizing circuit to apply thereto one of said oscillatory pulses during each frame and to prevent the remaining oscillatory pulses from reaching said synchronizing circuit.

2. In the apparatus of claim 1, said selective means comprising an electrical filter tuned to pass said pulse having oscillatory energy of a given frequency and to reject said remaining pulses.

3. The apparatus of claim 1, in which said synchronizing circuit for said coloring device comprises a phase-discriminator and a timing control means connected thereto, said coloring means including a source of timing signals, an electrical connection between said source of timing signals and said phase-discriminator, and an electrical connection between said timing control means and said coloring means.

References Cited in the file of this patent

UNITED STATES PATENTS

| | | |
|---|---|---|
| 2,378,746 | Beers | June 19, 1945 |
| 2,515,613 | Schoenfeld | July 18, 1950 |
| 2,546,972 | Chatterjea | Apr. 3, 1951 |
| 2,570,775 | De Baun | Oct. 9, 1951 |
| 2,594,380 | Barton | Apr. 29, 1952 |
| 2,653,187 | Luck | Sept. 22, 1953 |